(12) United States Patent
La Rosa et al.

(10) Patent No.: US 11,056,914 B2
(45) Date of Patent: Jul. 6, 2021

(54) ENERGY HARVESTING CIRCUIT, CORRESPONDING SYSTEM AND METHOD

(71) Applicant: STMicroelectronics S.r.l., Agrate Brianza (IT)

(72) Inventors: Roberto La Rosa, Catania (IT); Alessandro Finocchiaro, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/849,370

(22) Filed: Apr. 15, 2020

(65) Prior Publication Data
US 2020/0336006 A1    Oct. 22, 2020

(30) Foreign Application Priority Data

Apr. 18, 2019   (IT) .......................... 102019000006086

(51) Int. Cl.
| | |
|---|---|
| H01F 27/42 | (2006.01) |
| H01F 37/00 | (2006.01) |
| H01F 38/00 | (2006.01) |
| H02J 50/00 | (2016.01) |
| H02J 50/20 | (2016.01) |
| H02J 50/40 | (2016.01) |

(Continued)

(52) U.S. Cl.
CPC .......... *H02J 50/001* (2020.01); *H02J 7/0068* (2013.01); *H02J 7/345* (2013.01); *H02J 50/20* (2016.02); *H02J 50/40* (2016.02); *H02J 7/35* (2013.01); *H02J 2207/20* (2020.01)

(58) Field of Classification Search
CPC . H02J 5/005; H02J 7/025; H02J 17/00; H01F 38/14; B60L 11/182

USPC .......................................................... 307/104
See application file for complete search history.

(56) References Cited

U.S. PATENT DOCUMENTS

| | | | |
|---|---|---|---|
| 2016/0172852 A1* | 6/2016 | Tamura ..................... | H02J 1/06 307/151 |
| 2017/0257024 A1* | 9/2017 | Wu ........................ | H02M 3/07 |

(Continued)

FOREIGN PATENT DOCUMENTS

JP       6403036 B1    9/2018

OTHER PUBLICATIONS

IT Search Report and Written Opinion for IT Appl. No. 102019000006086 dated Nov. 7, 2019 (8 pages).

(Continued)

*Primary Examiner* — Quan Tra
(74) *Attorney, Agent, or Firm* — Crowe & Dunlevy

(57) ABSTRACT

A first Radio-Frequency-to-Direct-Current (RF2DC) transducer receives a first signal from a sensing antenna and generates energy stored by an energy storage circuit. An energy transfer circuit is controllably switched between an energy storage state where energy is stored in the energy storage state and an energy transfer state where stored energy is transferred to a load. The voltage at the energy storage circuit is alternatively variable between an upper value and a lower value around a voltage setting point. A second RF2DC transducer, which is a down-scaled replica of the first RF2DC transducer, produces a second signal indicative of an open-circuit voltage of the first RF2DC transducer. The voltage setting point is set as a function of the second signal indicative of the open-circuit voltage of the first RF2DC transducer.

15 Claims, 2 Drawing Sheets

(51) Int. Cl.
*H02J 7/00* (2006.01)
*H02J 7/34* (2006.01)
*H02J 7/35* (2006.01)

(56) References Cited

U.S. PATENT DOCUMENTS

2018/0183256 A1* 6/2018 Tanaka ............... G06K 19/0708
2019/0305583 A1* 10/2019 Tanaka ................... H02J 7/345

OTHER PUBLICATIONS

Zhao, et al., "RF Energy Harvester Design with Autonomously Adaptive Impedance Matching Network Based on Auxiliary Charge-pump Rectifier," IEEE Intn. Symp. of Circuits and Systems, 2011.
Martins, et al., "An RF Energy Harvester with MPPT Operating Across a Wide Range of Available Input Power," IEEE Intn. Symp. on Circuits and Systems, 2018.

\* cited by examiner

ENERGY HARVESTING CIRCUIT, CORRESPONDING SYSTEM AND METHOD

PRIORITY CLAIM

This application claims the priority benefit of Italian Application for Patent No. 102019000006086, filed on Apr. 18, 2019, the content of which is hereby incorporated by reference in its entirety to the maximum extent allowable by law.

TECHNICAL FIELD

The description relates to energy harvesting circuits.

One or more embodiments may find use in a variety of applications such as, e.g., in RF energy harvester devices such as ultra-low power (nano-Watt) RF energy harvesting applications for battery-less systems such as wireless sensor networks (WSNs).

BACKGROUND

In energy harvesting (or, according to other designations, power harvesting or energy scavenging), energy from one or more sources such as, e.g., solar panels, wind generators, thermal generators of various types, is stored for possible use in devices such as wireless portable devices or wireless sensors (e.g., in wireless sensor network—WSN—applications).

Specifically, WSNs for collecting and sharing data wirelessly across an Internet of Things (IoT) network may comprise sensors positioned in places hard to reach and service.

The capability of effectively tracking the (electrical) power available in a system may be helpful in meeting the increasing demand for, e.g., wireless sensor networks (WSNs) capable of collecting and sharing data in wireless operation while oftentimes positioned in places which are hard to reach and service.

An increasing demand thus exists for energy harvesting solutions which may facilitate implementing battery-free and/or set-and-forget sensor nodes, which in turn facilitates the production of devices adapted to be virtually ubiquitous and inherently maintenance-free, e.g., for IoT (Internet of Things) applications.

Techniques referred to as Maximum Power Point Tracking (MPPT) can be used to determine the maximum power available from these systems.

The power from such a system can be increased (maximized) by resorting to various approaches ranging from using simple voltage relationships to adopting more complex analysis based on collecting multiple samples.

Irrespective of the approach adopted, increasing the efficiency of power transfer while reducing the amount of power taken by the system itself to perform MPPT functions is a desirable target to achieve.

There is a need in the art to meet such a demand for improvement.

SUMMARY

One or more embodiments may relate to a system (e.g., an IoT node equipped with an energy harvesting device).

One or more embodiments may relate to a method.

One or more embodiments foresee an innovative Radio-Frequency-to-Direct-Current (RF2DC) transducer with a dedicated terminal for the easy measurement of the open circuit Voltage.

One or more embodiments may provide an open-circuit measurement arrangement which can operate (also) during normal (switching) operation of the converter so that reduction in harvesting efficiency may be negligible.

One or more embodiments may use a three-terminal cell, where open-circuit voltage is derived from a small "dummy" cell configured to reproduce the behavior of the "main" system with the dummy cell capable of providing, e.g., a measure of the open circuit voltage of the main system which in turn can be used to perform a MPPT function.

One or more embodiments may be based on the recognition of the fact that possible disadvantages related to the presence of an extra pin and to a (small) part of the system area being used for measurement purposes, rather than for energy production, may be compensated by various advantages including the simplification of the circuit architecture associated to MPPT functions (e.g., pre-regulation of a DC-DC converter) and the reduction of the power absorption, so that MPPT may become attractive also for (ultra) low-power systems, e.g. in the µW range.

For instance, in one or more embodiments "dummy" and "main" cells are packaged together, hence being exposed to like environmental conditions. As a result, MPPT tracking may work efficiently and advantageously without loss of performance also in a context of variable environmental conditions (e.g., outdoor atmospheric conditions affecting received signal amplitude level).

One or more embodiments advantageously and innovatively facilitate a continuous flow of energy from the scavenger to the converter, avoiding to disconnect the scavenger to measure open circuit voltage.

One or more embodiments may facilitate Ultra Low Power Energy Harvesting in the context of the Wireless Sensor Networks and IoT, facilitating efficient and worthwhile MPPT tracking.

One or more embodiments may provide a solution that makes the MPPT tracking worthwhile in Ultra-Low Power applications, where MPPT is normally neglected for the absence of a convenient way from the energy investment point of view. One or more embodiments may facilitate overcoming the general opinion that, since the power involved is so tiny in Ultra-Low Power applications, the extra circuitry involved to facilitate optimizing the power conversion have a power consumption not negligible with the power to be gained so that it makes it not worthwhile.

One or more embodiments facilitate reducing current absorption associated with MPPT functions (such as MPPT voltage pre-conditioning) to a value in the range of units of nA.

One or more embodiments may provide one or more of the following advantages:
  increased ("optimized") energy efficiency,
  system miniaturization, e.g., with reduced dimensions of the associated harvester,
  system flexibility, with the capability, e.g., in the case of photovoltaic (PV) systems, of adapting to indoor and outdoor conditions while preserving substantially identical energy performance,
  facilitate the diffusion of battery-free systems, because power consumption is negligible
  facilitating impedance matching and performing MPPT, gaining system performance improvement In one or more embodiments, an energy harvester circuit (and corresponding system and method) as per the present disclosure may provide a built-in reference voltage sensing circuitry, configured for performing MDPT tracking, for instance also in Ultra-Low power applications.

BRIEF DESCRIPTION OF THE DRAWINGS

One or more embodiments will now be described, by way of example only, with reference to the annexed figures, wherein.

DETAILED DESCRIPTION

Figure 2:
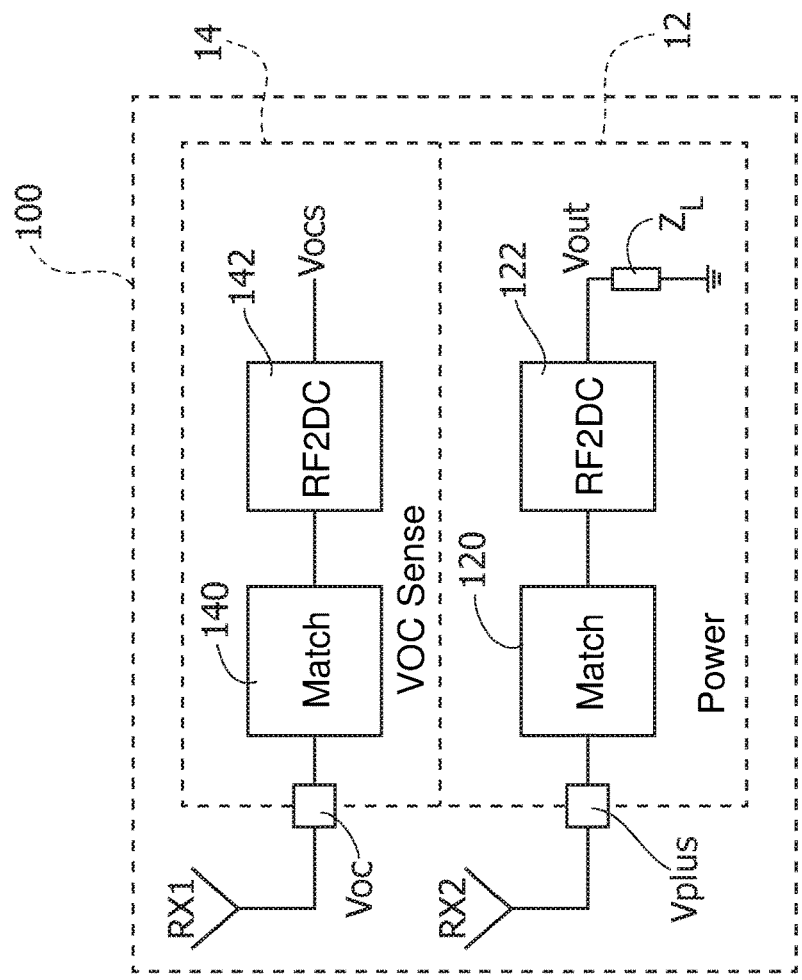
FIG. 2 is another circuit diagram exemplary of details of one or more embodiments according to FIG. 1.

In the ensuing description, one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments may exploit electromagnetic waves as a power source. For instance, one or more embodiments may be applied to a Radio-Frequency (RF) energy harvester circuit. An RF harvester as exemplified herein may rely on power extracted from RF radio waves as transmitted by a hub or base-station. An energy harvester as exemplified herein may thus act as a so-called Radio-Frequency-to-Direct-Current (RF2DC) converter.

Using RF energy harvesters may be facilitated by the capability of working with (very) low power levels so as to obtain a high operating distance (r) from the power emitting source. Propagation of RF energy may be modelled e.g. by means of the Friis equation, which results in power in free space decreasing as $r^2$, $P_R = P_T G_T G_R (\lambda/4\pi r)^2$, where $P_R$ is the power available at the input of the receiving antenna, $P_T$ is the output power of the transmitting antenna, $G_T$ and $G_R$ are the transmitting and receiving antenna gains, respectively, and $\lambda$ is the wavelength.

The lowest RF input power permitting the circuit to convert RF energy into DC is called sensitivity.

Another performance parameter is the power conversion efficiency (PCE), which is a measure of how efficiently the RF input power Pin is transformed into DC output power Pout, that is: $PCE = P_{out}/P_{in}$.

Designing energy harvesters may thus involve:
improving sensitivity with the aim of increasing the operating distance;
increasing PCE so that, e.g., the output power $P_{out}$ for a same input power $P_{in}$ may be increased.

In one or more embodiments, achieving MPPT may employ an Open Circuit method based on the observation that the voltage of the maximum power point is often close to a fixed percentage of the open-circuit voltage.

As discussed previously, tracking the point of operation of a system, e.g., with the aim of pursuing a maximum power point, is a desirable feature in energy harvesting systems.

In power generation systems such as RF energy harvesters, energy transfer may reach a "best" energy transfer point leading to a highest (maximum) power generation point.

The ability to adjust (quickly and precisely) the electrical operation point of the system to maximize power generation thus represent a desirable feature.

Various maximum power point tracking (MPPT) solutions have been devised over the years based on various strategies, comprising, e.g.: constant voltage, open circuit voltage, short circuit voltage, perturb and observe, incremental conductance, temperature, and temperature parametric.

These methods have advantages and disadvantages.

For instance, a constant voltage approach may represent a sensible choice due to its simplicity and the possibility of providing advantages such as: measurement of one parameter (only), reduced numerical computation requirements, absence of steady-state oscillations, and low-power consumption.

The last-mentioned advantage may be significant, e.g., in (ultra) low-power applications where the (very) small amounts of energy available may not justify implementing MPPT insofar as the energy taken to implement that function is hardly compensated (and may even be bigger) than the energy saved.

This remark suggests that a MPPT circuit for (ultra) low-power energy harvesting should desirably be as relatively simple as possible, so that the energy absorbed may be reduced to a level low enough to achieve a positive balance between energy saved and energy taken in performing a MPPT function.

In one or more embodiments, performing a MPPT function may involve measuring of an open circuit voltage Voc as discussed in the following.

The power delivered to a generic load by a Radio-Frequency-to-Direct Current (RF2DC) energy transducer is dependent on the its internal impedance. In particular, Maximum Power Transfer happens if there is a matching between an internal electrical resistance Rs of a RF2DC device and a load RL.

RF2DC transducer devices convert RF energy into DC electricity in a quantity dependent on the (input) received power at the antenna. For this device the (output) provided power is given by the equation: $Pout = (-Vout^2 + Vout*Voc)/Rs$, where Voc is the open circuit output voltage of the RF2DC, Rs is the internal electric resistance of the RF2DC. Output power provided by the RF2DC transducer versus the output voltage is a parabola having a maximum at the output voltage Vout=Voc/2 which is in turn the same condition obtained by having Rs=RL.

This poses a relevant issue during the design phase. The RF2DC internal impedance Rs, depends on the received power. Hence, in the design phase the power transfer can only be optimized for a single predefined received power and load condition. Such a condition hardly matches with a real-life situation: in fact, for a defined transmitted power and frequency, in a Wireless Power Transfer, the received power depends very much on the environmental conditions and the distance between the power receiver and transmitter. In general, the received power at the input of the RF2DC transducer cannot be considered fixed, as well the load condition is very variable during the power transferring.

This has the consequence that the system may only be optimum at a given condition, losing efficiency while the relative distance between Power Transmitter and Power Receiver varies or if the environmental conditions changes, as usually happens in practice.

The output power versus output voltage relationship exhibits a substantially (inverted) parabolic trend with a peak value at Vout=Voc/2.

This suggests that, in order to facilitate achieving an optimum power transfer, the RF2DC cell should desirably be conditioned in order to operate within a voltage range arranged in the vicinity of Voc/2. Also, in that case, the knowledge of the open voltage output value (Voc) may be helpful.

The capability of tracking the voltage Voc may be helpful to facilitate optimum power efficiency or achieving MPPT.

It is generally recognized that the open-circuit voltage method may have a disadvantage in that measuring the Voc voltage involves opening the circuit between the energy harvester and the power converter and sampling the voltage after the circuit has been opened.

As a result, no energy flows from the energy "scavenger" (that is the circuit used for measuring the open-circuit voltage) to the converter while the voltage Voc is sampled because the converter is disconnected, which may be for a time interval long enough to permit the input capacitance of the converter to be charged up to the voltage Voc.

In (ultra) low-power applications, the current delivered by the harvester is very low and the storage capacitor may have a value of, e.g., hundreds of μF. Meeting with load RMS requirements may thus involve (very) slow operation and could take a time of the order of several milliseconds.

A further disadvantage may lie in circuit complexity, insofar as the sampling activity may involve using a digital circuit and a fairly complex algorithm implemented, e.g., via a microcontroller. This may (further) increase circuit complexity with possible additional power losses.

The reference Martins, et al., "An RF Energy Harvester with MPPT Operating Across a Wide Range of Available Input Power," 2018 IEEE International Symposium on Circuits and Systems (ISCAS), 1-5 (incorporated by reference) discusses the design and simulation results of an RF energy harvesting circuit that operates across a wide range of available input power, from −27 dBm to 6 dBm. The system comprises an adaptive impedance matching network, a single-stage cross-connected differential rectifier, a start-up charge pump, an adaptive buck-boost converter and a Maximum Power Point Tracking (MPPT) circuit. The MPPT circuit controls the switching frequency of the buck-boost converter and configures the impedance matching network, optimizing the interfaces between the rectifier and antenna and between the rectifier and the storage capacitor, thereby facilitating that maximum power is being harvested. The system is designed in a standard 0.18 μm CMOS technology. The peak efficiency is 49.1% at an available input power of −18 dBm and signal frequency of 403.5 MHz.

Among others, such a solution presents the drawbacks of: presenting a calibration phase, having complexity, area and power consumption which are not negligible.

The reference Zhao, et al., "RF energy harvester design with autonomously adaptive impedance matching network based on auxiliary charge-pump rectifier," 2011 IEEE International Symposium of Circuits and Systems (ISCAS) (2011): 2477-2480 (incorporated by reference) discusses an implementation of a radio frequency wave energy harvester with the capability of self-adjusting the matching network to adapt to changing load conditions. An auxiliary charge-pump is designed to supply the power for the supplemental control unit. The design is implemented in a standard 0.13-μm CMOS process. The results show that the power transfer efficiency with using the proposed design can achieve a level of over 70% independent of the load conditions.

Among others, such a solution presents the drawbacks of: comprising auxiliary rectifier power supplies with a static current consumption a feedback control circuitry; loss of power dissipated in the sense resistor; consequently, a reduced power efficiency.

One or more embodiments may provide an open-circuit measurement arrangement which can operate (also) during normal (switching) operation of the converter so that reduction in harvesting efficiency may be negligible.

Figure 1:
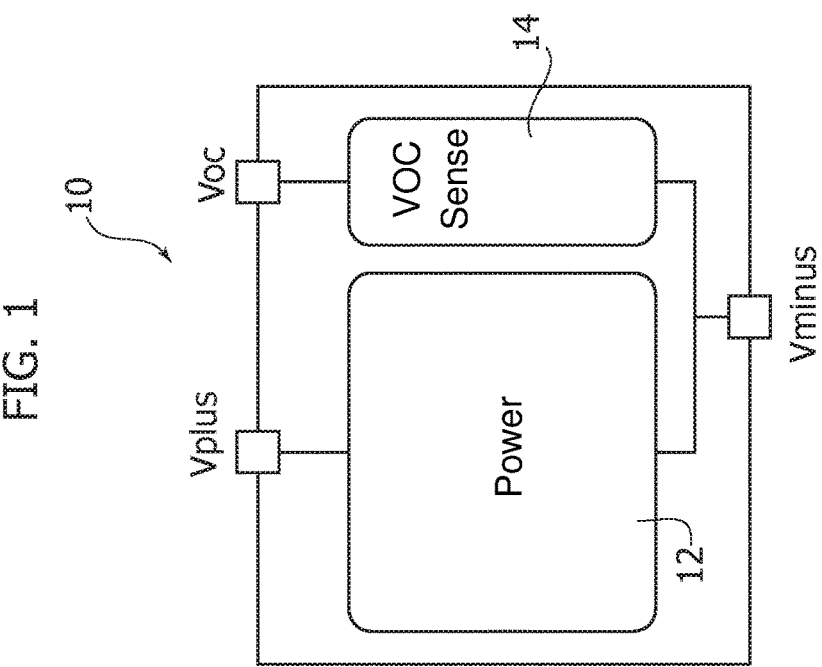
FIG. 1 is a circuit diagram exemplary of embodiments of an energy scavenger circuit.

According to an exemplary architecture as presented in FIG. 1, one or more embodiments may include device 10 including two sections, namely:
 a power section 12, essentially corresponding to a conventional (e.g., photovoltaic (PV) generator) providing an output voltage between two nodes Vplus and Vminus, and
 an open circuit voltage (Voc) sensing section 14; this may correspond to a sort of "miniaturized" scaled-down replica of the power section 12 and provide a Voc voltage (e.g., referred to Vminus) at a corresponding output node.

In one or more embodiments, the power section 12 may take the higher percentage of the volume/area of the whole device 10 and act as the energy generator/provider proper.

The sensing section 14 may be a sort of a scaled version, e.g. shrunk in area, of the power section 12 devoted to measuring the voltage Voc.

In operation, the sensing section 14 may be loaded lightly and/or provide a (much) lower power than the power section 12.

Consequently, the volume/area of the sensing section 14 may be (much) smaller and almost negligible with respect to the volume/area of the power section 12.

In the case of a power section 12 dimensioned to provide μA, this would result in a 1/10 area ratio, that is a scaling factor equal to 10.

In one or more embodiments, the ratio of the volume/area of the sensing section 14 to the volume/area of the power section 12 will be the (only) source of power inefficiency of the arrangement.

With a proper design of the device 10, this inefficiency can be reduced to a minimum, (well) below inefficiency level of conventional solutions.

In an arrangement as exemplified in FIG. 1 the device 10 may have three terminals or nodes, namely Vplus, Vminus and Voc, in comparison with—only—two terminals as possibly present in certain conventional arrangements.

This may be regarded as an apparent drawback, which however was found to be (largely) compensated by various advantages.

A first advantage may be an increased simplicity of the DC-DC converter. In one or more embodiments, such a converter may involve (only) an additional simple and (ultra) low-power comparator to perform the MPPT function. This may result in reduced circuit complexity related, e.g., to the possibility of dispensing with complex logic circuitry, algorithms and microcontrollers.

Another advantage may lie in improved energy efficiency achieved via reduced energy losses, e.g., due to series switches being dispensed with along with the associated $I^2$Ron losses.

A further increase in energy efficiency may derive from the continuous flow of energy from the device 10 to the converter, e.g., due to the possibility of avoiding disconnection in order to measure the Voc voltage.

Also, the possibility of reducing the size of the system as a whole (system miniaturization) will have a synergistic effect insofar as the additional volume/area taken by the device 14 will be (largely) compensated by the increase in energy efficiency.

Also, a possible simplified architecture of the DC-DC converter may facilitate adopting a low-cost architecture thus making it advantageous to apply MPPT also to (ultra) low-power applications.

Throughout the figures, e.g., FIG. 1, Vplus, Vminus and Voc denote a set of input lines to an energy harvester 10 adapted to receive an input voltage $V_{in}(t)$ from an energy source—not visible in the figures. Such an energy source may be, for instance, a radio-frequency source which may be sensed via a receiving antenna RX, RX1, RX2.

The input voltage $V_{in}(t)$ may be expressed as: $V_{in}(t)=V_A \sin(\omega t)$, where $V_A$ is the amplitude of the ac input signal, $\omega$ is the angular frequency given by $\omega=2\pi f$ and f is the operating frequency.

In one or more embodiments, the input voltage $V_{in}(t)$ may be differentially applied between Vplus and Vminus.

In one or more embodiments, the input voltage can be applied to one of the input lines (e.g., Vplus) by grounding the other line (e.g., Vminus).

In one or more embodiments, the input voltage can be applied to one of the input lines (e.g., Voc) by grounding the other line (e.g., Vminus).

In one or more embodiments, an energy harvester circuit 10 as exemplified herein may be terminated on a load $Z_L$, for instance $Z_L=R_L+j\omega C_L$, wherein $C_L$ is a capacitance which acts as an energy storage with a load resistance $R_L$ being representative of the current consumption of the system.

As exemplified in FIG. 1, such an energy harvester circuit 10 may comprise two circuit portions:
- a first portion 12, indicated also as "Power Section", which may take the higher percentage of the volume/area and that may provide energy in the circuit 10;
- a second portion 14, indicated also as "Sensing Section", comprising a scaled replica of the first portion/power section 12, which may be configured to measuring an open-circuit voltage Voc.

FIG. 2 is exemplary of an energy scavenger or harvester device 100 employing the circuit 10 as discussed herein.

Figure 3:
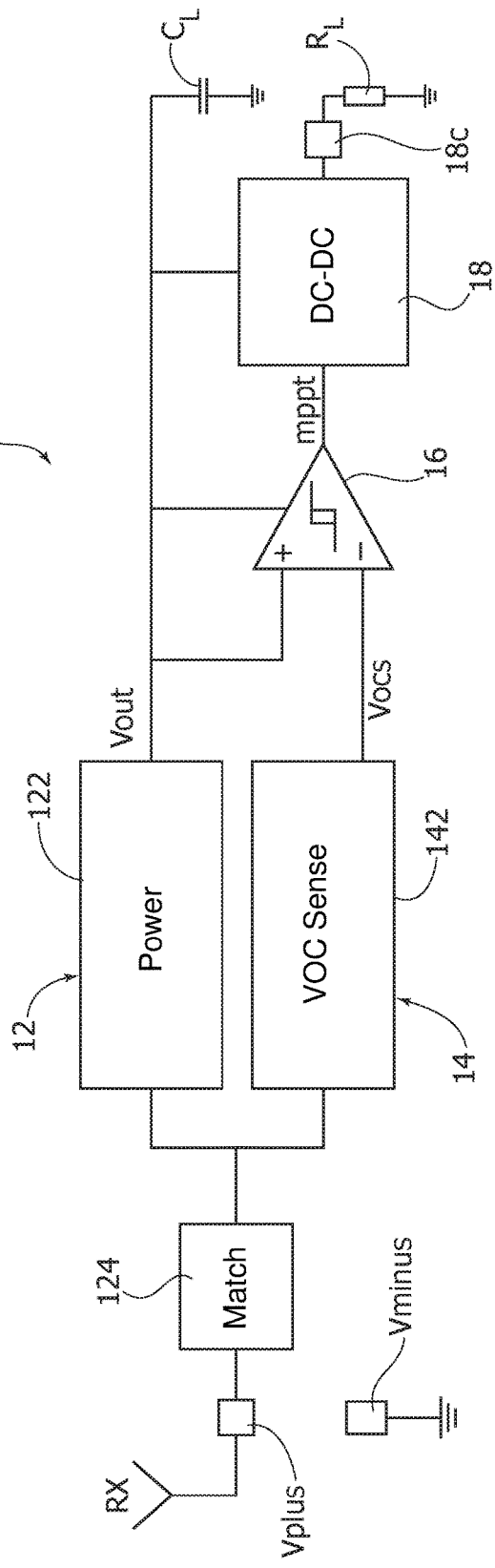
FIG. 3 is still another circuit diagram exemplary of embodiments.

As exemplified in FIGS. 2 and 3, the first portion 12 may comprise:
- a matching network 120, and
- a first RF2DC power converter 122, configured to provide a DC output voltage Vout as a function of input voltage received at the input node Vplus, Vminus e.g., via an antenna RX; RX1.

As exemplified in FIGS. 2 and 3, the second portion 14 may comprise:
- a matching network 140, and
- a second RF2DC power converter 142, configured to sense a, e.g., scaled, open-circuit voltage Voc at a node Vocs as a function of input voltage Vplus, Vminus received at the input node Voc, e.g., via an antenna RX; RX2.

In one or more embodiments as exemplified in FIG. 2, as mentioned, an open-circuit sensing node Vocs in the second portion 14 of the energy harvesting circuit 10 may be lightly loaded, hence providing a much lower output voltage (and power) than the first portion 12, from which the name "power section".

In one or more embodiments, as a result, a Volume/Area ratio of the second portion 14 circuitry may be much lower or better yet negligible with respect to a Volume/Area ratio of the power section 12. In one or more embodiments, the more such a volume area ratio of the second portion is negligible with respect to the Volume/Area ratio of the power section 12, the more efficient the scavenger.

In one or more embodiments as exemplified in FIG. 3, a single receiving antenna RX and a common matching network 124 may be employed in place of separate (matching network) stages, conveniently reducing area consumption in the device 100.

In one or more embodiments, the power section 122 presents a first impedance value while the sensing section 142 presents a second impedance value, wherein the first impedance value is much higher than the second impedance value. This may cause the impedance of the sensing section 122 to be dominant, leading to a negligible energy dissipation in the power section 122.

In one or more embodiments as exemplified in FIG. 3:
- the RF2DC in the power section 122 may comprise a first voltage multiplier, for instance having a first multiplication factor of N, e.g., N=2;
- the RF2DC in the sensing section 142 may comprise a second voltage multiplier having a second multiplication factor M times lower than the first multiplication ratio, e.g. the second multiplication ratio may be N/M, e.g., N=2, M=2, N/M=1.

In one or more embodiments, the ratio between the first multiplication factor and the second multiplication factor may advantageously be of one half, hence providing a reference of half of the open-voltage Voc, e.g., Vocs=Voc/M=Voc/2.

As exemplified in FIG. 2 and in FIG. 3, the sensing section 14 may be coupled to a comparator 16, e.g., having a high input impedance value. In this way, the sensed open-circuit voltage Vocs is sensed in a condition in which it is an accurate scaled measure of the "true" open-circuit voltage Voc.

This may be advantageously achieved (even) without employing a divider circuit which may introduce measurement errors as well as it may be challenging from a point of view of circuit integration. Advantageously, expensive current and area consumption may be avoided.

In one or more embodiments, both the power section 12 and the sensing section 14 may be coupled to the comparator 16. The comparator 16 may be a window comparator configured to provide as output a signal mppt. The comparator may be further coupled to a DC-DC converter 18, e.g. a buck-boost converter, configured to provide as output a signal Vout to the respective node in the device 100.

In one or more embodiments, the comparator 16 may advantageously be an extra simple ultra-low power comparator, which may be employed to perform MPPT function, reducing circuit complexity.

For instance, in an exemplary embodiment as presented in FIG. 3, the Vplus terminal of the "main" PV cell 12 may provide energy to a storage element such as a capacitor $C_L$.

Figure 4B:
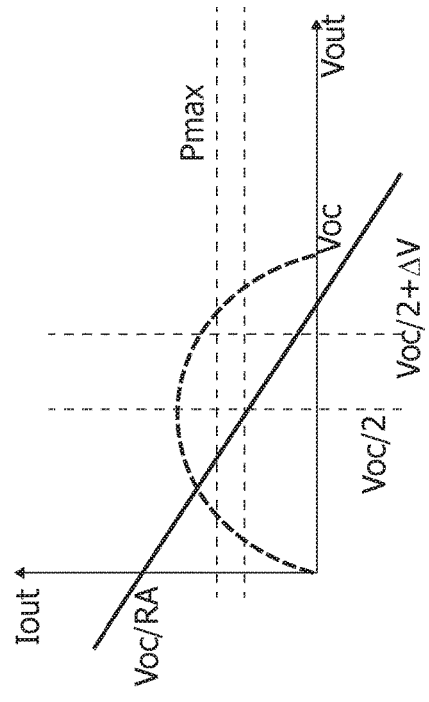
FIGS. 4A and 4B are exemplary diagrams of principles underlying one or more embodiments of an energy scavenger circuit.
Figure 4A:
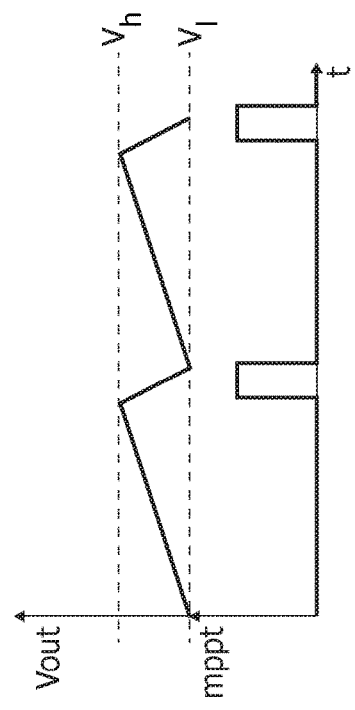

In a steady-state condition, the voltage Vout stored on the element $C_L$ may toggle between two voltages Vh and Vl as exemplified in FIG. 4A.

For instance, as a result of Vout reaching an (upper) voltage Vh, a transfer mechanism of the energy stored at 16 can be activated towards a load $Z_L$ (see the right-hand side of FIG. 3), which per se may be distinct from the embodiments, e.g., an IoT node, with the load $Z_L$ coupled to an output node 18c of the DC-DC converter 18.

In an exemplary embodiment as presented in FIG. 3, energy transfer towards the load $Z_L$ may be, e.g., via the DC-DC converter 18 (which per se may be of a conventional, simplified design) controlled via the signal mppt from the comparator 16 as discussed in the following.

As a result of energy being transferred to the load, the voltage Vout may drop from an upper value Vh (see again the diagram of FIG. 4A) to a lower value Vl, with the DC-DC converter 18 turned off (energy transfer discontinued), thereby facilitating renewed storage of energy on the element 16 until the upper value Vh is reached again.

In one or more embodiments, the drop from Vh to Vl may be limited, e.g., in such a way that the average of Vout will "track" a desired voltage for MPPT.

For instance, for a given PV cell 12, Vh and Vl can be selected so that Vh=Voc/2+ΔV and Vl=Voc/2−ΔV with Vh+Vl=Voc, with ΔV selected in such a way that power loss with respect to the highest value is maintained within a desired range (e.g., 90%).

As mentioned, the voltage sensed by the sensing section 12 may provide a scaled version Vocs of the voltage Voc, e.g., with a scaling factor which is given by the ratio of the multiplication factors of the voltage multipliers 122, 142, namely M, with that ratio lying, e.g., around 2 so that Vocs may provide a good approximation of Voc/2 (being notionally identical thereto).

In one or more embodiments a simple (low-cost) ultra-low-power comparator 16 (e.g., coupled to the DC-DC converter 18b) may condition the voltage stored at $C_L$ (e.g., by controlling the toggling cycles as exemplified in FIG. 4A) in order to facilitate its average to track the Voc/2 voltage in various environmental conditions, e.g., via a circuit block possibly integrated in the DC-DC converter 18.

For instance, FIG. 4B is diagram exemplary of the relationship between the output power Pout and the output voltage Vout of a RF energy harvester device.

The relationship exemplified in FIG. 4B exhibits a peak value Pmax for the output power at a voltage Voc/2, so that the "toggling" operation of the DC-DC converter 18 between Vh and Vl as discussed in connection with FIG. 4A may facilitate avoiding that the output power may drop below, e.g., 90% of the peak value.

As noted, the voltage Voc/2 in a power cell such as 12 may vary over time depending on the operating conditions such as input signal $V_{in}(t)$ amplitude $V_A$.

Adequate operation of the cell may thus involve selectively varying Vh+Vl is such a way to "track" such operating conditions by keeping Vh+Vl around Voc/2.

In one or more embodiments, a measure (at least approximate) of Voc, may be provided by the output Vocs from the sensing portion 14 associated with the small-scale "replica" of the power section 12.

In one or more embodiments the values for Vh and Vl may self-adapt to the various power generation conditions which may vary dynamically with the ambient conditions.

In one or more embodiments, this type of operation (see again the toggling behavior exemplified in FIG. 4A) may be implemented by using a hysteresis comparator 18a which changes state at the upper end and lower end of an interval ΔV set around Voc/2 (e.g. an interval (Voc/2; Voc/2+ΔV) centered at Voc/2), with these upper/lower ends or bounds corresponding to Vh and Vl.

In one or more embodiments, electrically powered system, optionally battery-less electrically powered system (e.g., a mobile RF terminal or a wireless sensor comprising at least one RF sensing antenna RX) may include an energy harvester circuit 10 as exemplified herein.

In one or more embodiments, an energy harvester circuit (for instance, 10) may comprise:
- a first radio-frequency-to-direct-current, RF2DC, transducer (for instance, 12), configured to receive a first signal (for instance, Vplus, Vminus) from at least one radio-frequency sensing antenna (for instance, RX; RX1, RX2),
- an energy storage circuit section (for instance, $C_L$) coupled to the first RF2DC transducer and supplied with the first signal (for instance, Vplus, Vminus) therefrom,
- energy transfer circuitry (for instance, 18) coupled to the energy storage circuit section and configured to transfer towards an output node (for instance, 18c) energy stored in the energy storage circuit section,
- driver circuitry (for instance, 16) coupled to the energy transfer circuitry, the driver circuitry configured to controllably switch the energy transfer circuitry between an energy storage state of the first signal from the first generator in the energy storage circuit section and an energy transfer state of the energy stored in the energy storage circuit section towards the output node, the voltage at the energy storage circuit section alternatively variable between an upper value (for instance, Vh) and a lower value (for instance, Vl) around a voltage setting point (for instance, Voc/2), and
- a second RF2DC transducer (for instance, 14) comprising a down-scaled replica of the first RF2DC transducer, the second RF2DC transducer configured to produce a second signal (for instance, Vocs) indicative of the open-circuit voltage of the first RF2DC transducer, the second RF2DC transducer coupled to the driver circuitry of the energy transfer circuitry, wherein the driver circuitry of the energy transfer circuitry is sensitive to the second signal from the second RF2DC transducer (for instance, 14), with said voltage setting point set as a function of the second signal from the second RF2DC transducer indicative of the open-circuit voltage of the first RF2DC transducer.

In one or more embodiments of the circuit (10):
- the first RF2DC transducer may comprise a first voltage multiplier (for instance, 122) configured to be coupled to said at least one radio-frequency sensing antenna and to the driver circuitry of the energy transfer circuitry, and
- the second RF2DC transducer may comprise a second voltage multiplier (for instance, 142) configured to be coupled the driver circuitry of the energy transfer circuitry, with an output voltage (for instance, Vocs) from said second RF2DC transducer coupled to the driver circuitry of the energy transfer circuitry.

In one or more embodiments, the driver circuitry of the energy transfer circuitry may comprise a comparator (for instance, 16) coupled to the energy storage circuit section and to the second RF2DC transducer, the comparator sensitive to the voltage at the energy storage circuit section and the second signal from the second RF2DC transducer.

In one or more embodiments, the comparator may comprise a hysteresis comparator configured to change state at an upper end and a lower end of a hysteresis interval around said voltage setting point (for instance, Voc/2).

In one or more embodiments, the second RF2DC transducer may comprise a down-scaled replica of the first generator, preferably with a scaling factor equal to two.

One or more embodiments may comprise a system, comprising:
- at least one radio-frequency antenna (for instance, RX; RX1, RX2) configured to sense a RF signal (for instance, Vplus, Vminus),
- at least one circuit (for instance, 10) according to one or more embodiments having said first RF2DC transducer (for instance, 12) coupled (for instance, 120, 140; 124) to said at least one radio-frequency antenna to receive therefrom said first signal (for instance, Vplus, Vminus),
- an electrical load (for instance, $Z_L$) coupled to the output node (for instance, 18c) of the circuit to be supplied thereby.

In one or more embodiments, the system may have said second RF2DC transducer coupled to said at least one radio-frequency antenna to receive said first signal therefrom.

One or more embodiments may comprise a method, comprising:
- providing at least one RF sensing antenna (for instance, RX; RX1, RX2),
- receiving a first signal (for instance, Vplus, Vminus) via a first RF2DC transducer (for instance, 12) coupled to said at least one RF sensing antenna,
- providing an energy storage circuit section (for instance, $C_L$) coupled to the first RF2DC transducer and supplied with the first signal therefrom,
- transferring energy stored in the energy storage circuit section towards an output node (for instance, 18c) via energy transfer circuitry (for instance, 18) controllably switched (for instance, 16) between an energy storage state of the first signal from the first RF2DC transducer in the energy storage circuit section and an energy transfer state of the energy stored in the energy storage circuit section towards the output node, wherein the voltage (for instance, Vout) at the energy storage circuit section alternatively varies between an upper value (for instance, Vh) and a lower value (for instance, V1) around a voltage setting point (for instance, Voc/2),
- producing a second signal (for instance, Vocs) via a second RF2DC transducer (for instance, 14) comprising a down-scaled replica of the first RF2DC transducer (for instance, 12), the second signal indicative of the open-circuit voltage of the first RF2DC transducer, and
- setting said voltage setting point as a function of the second signal from the second RF2DC transducer indicative of the open-circuit voltage (for instance, Voc) of the first generator.

In one or more embodiments, the method may comprise receiving a first signal (for instance, Vplus, Vminus) via the second RF2DC transducer coupled to said at least one RF sensing antenna to receive said first signal therefrom.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

The claims are an integral part of the technical disclosure of one or more embodiments as provided herein.

Without prejudice to the underlying principles, the details and embodiments may vary, even significantly, with respect to what has been described by way of example only, without departing from the extent of protection. The extent of protection is defined by the annexed claims.

The invention claimed is:

1. An energy harvester circuit, comprising:
a first radio-frequency-to-direct-current (RF2DC) transducer configured to receive a first signal from a first radio-frequency sensing antenna;
an energy storage circuit coupled to an output of the first RF2DC transducer and supplied with energy derived from the first signal;
energy transfer circuitry coupled to the energy storage circuit;
driver circuitry coupled to the energy transfer circuitry, the driver circuitry configured to controllably switch the energy transfer circuitry between an energy storage operation where energy from the first RF2DC transducer is stored in the energy storage circuit and an energy transfer operation where the stored energy in the energy storage circuit is transferred towards an output node, a voltage at the energy storage circuit varying between an upper value and a lower value around a voltage setting point; and
a second RF2DC transducer comprising a down-scaled replica of the first RF2DC transducer, the second RF2DC transducer configured to produce a second signal indicative of an open-circuit voltage of the first RF2DC transducer;
wherein the driver circuitry receives the second signal from the second RF2DC transducer and sets said voltage setting point set in response to the second signal indicative of the open-circuit voltage of the first RF2DC transducer.

2. The circuit of claim 1, wherein:
the first RF2DC transducer comprises a first voltage multiplier configured to be coupled to said first radio-frequency sensing antenna and to the driver circuitry of the energy transfer circuitry; and
the second RF2DC transducer comprises a second voltage multiplier configured to be coupled the driver circuitry of the energy transfer circuitry, with an output voltage from said second RF2DC transducer coupled to the driver circuitry of the energy transfer circuitry.

3. The circuit of claim 1, wherein the driver circuitry comprises a comparator having inputs coupled to the energy storage circuit and to the second RF2DC transducer, wherein the comparator is sensitive to the voltage at the energy storage circuit and the second signal from the second RF2DC transducer.

4. The circuit of claim 3, wherein the comparator comprises a hysteresis comparator configured to change state at an upper end and a lower end of a hysteresis interval around said voltage setting point.

5. The circuit of claim 1, wherein a scaling factor of the down-scaled replica is equal to 2.

6. The circuit of claim 1, wherein the energy transfer circuit comprises a DC-DC converter controlled by a control signal, and further comprising a comparator configured to compare the voltage at the energy storage circuit to the second signal indicative of an open-circuit voltage of the first RF2DC transducer and generate said control signal in response to the comparison.

7. The circuit of claim 1, wherein the second RF2DC transducer is coupled to receive the first signal from said first radio-frequency antenna.

8. The circuit of claim 1, wherein the second RF2DC transducer is coupled to receive a third signal from a second radio-frequency antenna.

9. The circuit of claim 1, further comprising an electrical load coupled to the output node.

10. A method, comprising:
    receiving a first signal via a first radio-frequency-to-direct-current (RF2DC) transducer coupled to a first RF sensing antenna;
    operating the first RF2DC transducer to generate energy derived from said first signal;
    controllably switching between:
        an energy storage operation to store energy output from the first RF2DC transducer in the energy storage circuit; and
        an energy transfer operation to transfer the stored energy from the energy storage circuit towards an output node;
    wherein a voltage of the stored energy varies between an upper value and a lower value around a voltage setting point;
    operating a second RF2DC transducer, which is a down-scaled replica of the first RF2DC transducer, to produce a second signal indicative of an open-circuit voltage of the first RF2DC transducer; and
    setting said voltage setting point as a function of the second signal indicative of the open-circuit voltage of the first RF2DC transducer.

11. The method of claim 10, further comprising receiving said first signal via the second RF2DC transducer coupled to the first RF sensing antenna.

12. The method of claim 10, further comprising receiving a third signal via the second RF2DC transducer coupled to a second RF sensing antenna.

13. The method of claim 10, wherein:
    operating the first RF2DC transducer comprises operating as a voltage multiplier; and
    operating the second RF2DC transducer comprises operating the second RF2DC transducer as a voltage multiplier.

14. The method of claim 10, further comprising:
    comparing the voltage of the stored energy and the second signal from the second RF2DC transducer to generate a control signal; and
    operating a DC-DC converter to generate an output voltage at said output node in response to the control signal.

15. The method of claim 10, wherein a scaling factor of the down-scaled replica is equal to 2.

* * * * *